(12) United States Patent
Gottemoller et al.

(10) Patent No.: US 8,054,016 B2
(45) Date of Patent: Nov. 8, 2011

(54) RETARDING ENERGY CALCULATOR FOR AN ELECTRIC DRIVE MACHINE

(75) Inventors: Benjamin P. Gottemoller, Peoria, IL (US); Benjamin Miller, Peoria, IL (US); Tamran H. Lengyel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 503 days.

(21) Appl. No.: 12/210,838

(22) Filed: Sep. 15, 2008

(65) Prior Publication Data

US 2010/0066292 A1    Mar. 18, 2010

(51) Int. Cl.
*H02P 3/12* (2006.01)
*H02P 3/22* (2006.01)

(52) U.S. Cl. ........ 318/380; 318/143; 318/153; 318/146; 318/375; 318/376; 322/16

(58) Field of Classification Search .......... 318/380, 318/156, 143, 153, 375, 376; 322/16
See application file for complete search history.

(56) References Cited

U.S. PATENT DOCUMENTS

| | | |
|---|---|---|
| 2,279,407 A | 8/1942 | McCune |
| 2,409,099 A | 10/1946 | Bloomfield |
| 2,482,840 A | 9/1949 | Collins et al. |
| 2,520,204 A | 8/1950 | Hancock |
| 3,216,769 A | 11/1965 | Hicks et al. |
| 3,250,973 A | 5/1966 | Dawson |
| 3,259,216 A | 7/1966 | Klaus et al. |
| 3,370,218 A | 2/1968 | Merz |
| 3,410,375 A | 11/1968 | Schmidt |
| 3,495,404 A | 2/1970 | Thompson |
| 3,562,565 A | 2/1971 | Higashino |
| 3,670,854 A | 6/1972 | Maci |
| 3,696,893 A | 10/1972 | Koivunen |
| 3,730,596 A | 5/1973 | Felix et al. |
| 3,774,095 A | 11/1973 | Coccia |
| 3,944,287 A | 3/1976 | Nagase |
| 3,992,062 A | 11/1976 | Jeffrey et al. |
| 4,031,440 A | 6/1977 | Christian et al. |
| 4,054,821 A | 10/1977 | Williamson |
| 4,083,469 A | 4/1978 | Schexnayder |
| 4,143,280 A | 3/1979 | Kuehn, Jr. et al. |
| 4,181,366 A | 1/1980 | Dobner |
| 4,270,806 A | 6/1981 | Venkataperumal et al. |
| 4,280,073 A | 7/1981 | Miller |
| 4,292,531 A | 9/1981 | Williamson |
| 4,313,517 A | 2/1982 | Pivar |
| 4,482,813 A | 11/1984 | Grand-Perret et al. |
| 4,495,449 A | 1/1985 | Black et al. |

(Continued)

*Primary Examiner* — Bentsu Ro
*Assistant Examiner* — Erick Glass
(74) *Attorney, Agent, or Firm* — Leydig, Voit & Mayer

(57) ABSTRACT

A cooling system for a retarding system of an electric drive machine (100) includes a direct current (DC) link having first and second rails. A first resistor grid (214) is selectively placed in circuit between the rails by an automatic switch (216) in response to a switch (216) signal. A second resistor grid (218) is selectively placed in circuit between the rails by a chopper circuit (220) connected in series with the second resistor grid (218). The chopper modulates a current passing therethrough based on a duty cycle. A motor (336) is in parallel electrical connection across a portion of the first resistor grid (214) and operates in response to a motor (336) signal. An electronic controller (400) calculates a net energy during operation and adjusts the switch (216) signal, the duty cycle, and the motor (336) signal to close the automatic electrical switch (216) and operate the motor (336) when the net energy exceeds a threshold value.

15 Claims, 6 Drawing Sheets

U.S. PATENT DOCUMENTS

| | | | |
|---|---|---|---|
| 4,651,071 A | 3/1987 | Imanaka | |
| 4,659,149 A | 4/1987 | Rumsey et al. | |
| 4,671,577 A | 6/1987 | Woods | |
| 4,698,561 A | 10/1987 | Buchanan et al. | |
| 4,772,829 A | 9/1988 | Pickering et al. | |
| 4,938,321 A | 7/1990 | Kelley et al. | |
| 4,962,969 A | 10/1990 | Davis | |
| 4,965,513 A | 10/1990 | Haynes et al. | |
| 5,103,923 A | 4/1992 | Johnston et al. | |
| 5,139,121 A | 8/1992 | Kumura et al. | |
| 5,222,787 A | 6/1993 | Eddy et al. | |
| 5,280,223 A | 1/1994 | Grabowski et al. | |
| 5,293,966 A | 3/1994 | Chareire | |
| 5,302,008 A | 4/1994 | Miyake et al. | |
| 5,322,147 A | 6/1994 | Clemens | |
| 5,323,095 A | 6/1994 | Kumar | |
| 5,351,775 A | 10/1994 | Johnston et al. | |
| 5,355,978 A | 10/1994 | Price et al. | |
| 5,362,135 A | 11/1994 | Riddiford et al. | |
| 5,378,053 A | 1/1995 | Patient et al. | |
| 5,432,413 A | 7/1995 | Duke et al. | |
| 5,450,324 A | 9/1995 | Cikanek | |
| 5,469,943 A | 11/1995 | Hill et al. | |
| 5,472,264 A | 12/1995 | Klein et al. | |
| 5,476,310 A | 12/1995 | Ohtsu et al. | |
| 5,492,192 A | 2/1996 | Brooks et al. | |
| 5,511,859 A | 4/1996 | Kade et al. | |
| 5,523,701 A | 6/1996 | Smith et al. | |
| 5,539,641 A | 7/1996 | Littlejohn | |
| 5,551,764 A | 9/1996 | Kircher et al. | |
| 5,573,312 A | 11/1996 | Müller et al. | |
| 5,615,933 A | 4/1997 | Kidston et al. | |
| 5,632,534 A | 5/1997 | Knechtges | |
| 5,707,115 A | 1/1998 | Bodie et al. | |
| 5,754,450 A | 5/1998 | Solomon et al. | |
| 5,755,302 A | 5/1998 | Lutz et al. | |
| 5,769,509 A | 6/1998 | Feigel et al. | |
| 5,775,784 A | 7/1998 | Koga et al. | |
| 5,832,395 A | 11/1998 | Takeda et al. | |
| 5,839,800 A | 11/1998 | Koga et al. | |
| 5,853,229 A | 12/1998 | Willmann et al. | |
| 5,951,115 A | 9/1999 | Sakai et al. | |
| 5,961,190 A | 10/1999 | Brandmeier et al. | |
| 5,962,997 A | 10/1999 | Maisch | |
| 5,983,149 A | 11/1999 | Tate et al. | |
| 6,076,899 A | 6/2000 | Isella | |
| 6,078,173 A | 6/2000 | Kumar et al. | |
| 6,087,791 A | 7/2000 | Maruyama | |
| 6,120,115 A | 9/2000 | Manabe | |
| 6,158,822 A | 12/2000 | Shirai et al. | |
| 6,213,567 B1 | 4/2001 | Zittlau et al. | |
| 6,226,586 B1 | 5/2001 | Luckevich et al. | |
| 6,231,134 B1 | 5/2001 | Fukasawa et al. | |
| 6,242,873 B1 | 6/2001 | Drozdz et al. | |
| 6,318,487 B2 | 11/2001 | Yanase et al. | |
| 6,325,470 B1 | 12/2001 | Schneider | |
| 6,392,418 B1 | 5/2002 | Mir et al. | |
| 6,425,643 B2 | 7/2002 | Shirai et al. | |
| 6,441,573 B1 | 8/2002 | Zuber et al. | |
| 6,456,909 B1 | 9/2002 | Shimada et al. | |
| 6,457,784 B1 | 10/2002 | Böhm et al. | |
| 6,488,344 B2 | 12/2002 | Huls et al. | |
| 6,547,343 B1 | 4/2003 | Hac | |
| 6,560,515 B2 | 5/2003 | Inoue | |
| 6,663,197 B2 | 12/2003 | Joyce | |
| 6,664,653 B1 | 12/2003 | Edelman | |
| 6,687,593 B1 | 2/2004 | Crombez et al. | |
| 6,709,075 B1 | 3/2004 | Crombez et al. | |
| 6,724,165 B2 | 4/2004 | Hughes | |
| 6,771,040 B2 | 8/2004 | Kusumoto | |
| 6,815,933 B2 | 11/2004 | Taniguchi et al. | |
| 6,885,920 B2 | 4/2005 | Yakes et al. | |
| 6,910,747 B2 | 6/2005 | Tsunehara | |
| 6,933,692 B2 | 8/2005 | Gabriel et al. | |
| 6,959,971 B2 | 11/2005 | Tsunehara | |
| 6,986,727 B2 | 1/2006 | Kuras et al. | |
| 7,029,077 B2 | 4/2006 | Anwar et al. | |
| 7,059,691 B2 | 6/2006 | Tsunehara et al. | |
| 7,104,617 B2 | 9/2006 | Brown | |
| 7,136,737 B2 | 11/2006 | Ashizawa et al. | |
| 7,290,840 B2 | 11/2007 | Tsunehara et al. | |
| 7,304,445 B2 * | 12/2007 | Donnelly | 318/108 |
| 7,308,352 B2 | 12/2007 | Wang et al. | |
| 7,311,163 B2 | 12/2007 | Oliver | |
| 7,330,012 B2 | 2/2008 | Ahmad et al. | |
| 7,378,808 B2 | 5/2008 | Kuras et al. | |
| 7,385,372 B2 | 6/2008 | Ahmad et al. | |
| 7,609,024 B2 * | 10/2009 | Ahmad et al. | 318/811 |
| 7,667,347 B2 * | 2/2010 | Donnelly et al. | 307/10.1 |
| 7,669,534 B2 * | 3/2010 | Kumar et al. | 105/35 |
| 2001/0024062 A1 | 9/2001 | Yoshino | |
| 2002/0043962 A1 | 4/2002 | Taniguchi et al. | |
| 2002/0050739 A1 | 5/2002 | Koepff et al. | |
| 2002/0117984 A1 | 8/2002 | Zuber et al. | |
| 2003/0132039 A1 | 7/2003 | Gaffney et al. | |
| 2003/0149521 A1 | 8/2003 | Minowa et al. | |
| 2003/0151387 A1 | 8/2003 | Kumar | |
| 2003/0169002 A1 | 9/2003 | Hughes | |
| 2004/0090116 A1 | 5/2004 | Tsunehara | |
| 2004/0108789 A1 | 6/2004 | Marshall | |
| 2004/0238243 A1 * | 12/2004 | King et al. | 180/65.2 |
| 2004/0239180 A1 | 12/2004 | Foust | |
| 2004/0251095 A1 | 12/2004 | Simard et al. | |
| 2005/0099146 A1 | 5/2005 | Nishikawa et al. | |
| 2006/0047400 A1 | 3/2006 | Prakash et al. | |
| 2006/0055240 A1 | 3/2006 | Toyota et al. | |
| 2006/0086547 A1 | 4/2006 | Shimada et al. | |
| 2006/0089777 A1 | 4/2006 | Riddiford et al. | |
| 2006/0102394 A1 | 5/2006 | Oliver | |
| 2007/0016340 A1 | 1/2007 | Soudier et al. | |
| 2007/0145918 A1 | 6/2007 | Kumar et al. | |
| 2007/0182359 A1 | 8/2007 | Wahler | |
| 2008/0084229 A1 | 4/2008 | Frommer et al. | |
| 2010/0066227 A1 * | 3/2010 | Ramm et al. | 312/408 |
| 2010/0066294 A1 * | 3/2010 | Hendrickson et al. | 318/490 |
| 2010/0066400 A1 * | 3/2010 | Hendrickson et al. | 324/765 |
| 2010/0066551 A1 * | 3/2010 | Bailey et al. | 340/648 |
| 2010/0070120 A1 * | 3/2010 | Bailey et al. | 701/22 |
| 2010/0200969 A1 * | 8/2010 | Huang et al. | 257/666 |

* cited by examiner

RETARDING ENERGY CALCULATOR FOR AN ELECTRIC DRIVE MACHINE

TECHNICAL FIELD

This patent disclosure relates generally to retarding systems and methods for electric drives and more particularly, to retarding systems and methods that dissipate retard energy in the form of heat.

BACKGROUND

Electric drive systems for machines typically include a power circuit that selectively activates a motor at a desired torque. The motor is typically connected to a wheel or other traction device that operates to propel the machine. A hybrid drive system includes a prime mover, for example, an internal combustion engine, that drives a generator. The generator produces electrical power that is used to drive the motor. When the machine is propelled, mechanical power produced by the engine is converted to electrical power at the generator. This electrical power is often processed and/or conditioned before being supplied to the motor. The motor transforms the electrical power back into mechanical power to drive the wheels and propel the vehicle.

The machine is retarded in a mode of operation during which the operator desires to decelerate the machine. To retard the machine in this mode, the power from the engine is reduced. Typical machines also include brakes and some type of retarding mechanism to decelerate and/or stop the machine. As the machine decelerates, the momentum of the machine is transferred to the motor via rotation of the wheels. The motor acts as a generator to convert the kinetic energy of the machine to electrical power that is supplied to the drive system. This electrical energy can be dissipated through wasting, storage, or other consumption by the system in order to absorb the machine's kinetic energy.

A typical electrical retarding system includes a series of resistors or other impedance devices, through which thermal energy is dissipated when electrical current passes therethrough. Due to the size of the machine components and the magnitude of the momentum retarded, large amounts of thermal energy may be dissipated through these impedance devices, which would greatly elevate their temperature. Accordingly, various solutions in the past have involved utilizing active cooling systems to reduce the temperature of these devices. Forced convection by use of a fan or blower provides one form of active cooling for impedance devices used in electric retarding systems.

Known systems using fans or blowers include an electrically driven fan that creates an airflow passing over the impendence devices to cool them by forced convection. Such motors are typically DC motors that operate at a certain DC voltage, which is supplied from the drive system. To regulate this voltage, past systems have included transformers with taps in the generator of the system, high voltage isolators, and so forth. These systems, however, are somewhat costly and deprive the drive system of useful electrical power during operation. They also tend to reduce the overall efficiency of the machine.

SUMMARY

The disclosure describes, in one aspect, a cooling system for a retarding system of an electric drive machine. The cooling system includes a direct current (DC) link having first and second rails. A first resistor grid is selectively placed in circuit between the rails by an automatic switch in response to a switch signal. A second resistor grid is selectively placed in circuit between the rails by a chopper circuit connected in series with the second resistor grid. The chopper modulates a current passing therethrough based on a duty cycle. A motor is in parallel electrical connection across a portion of the first resistor grid and operates in response to a motor signal. An electronic controller calculates a net energy during operation and adjusts the switch signal, the duty cycle, and the motor signal to close the automatic electrical switch and operate the motor when the net energy exceeds a threshold value.

In another aspect, the disclosure describes a machine having a hybrid-electric drive system, which includes an engine connected to a generator, a rectifier connected to the generator and to a direct current (DC) link, and an inverter connected to the DC link and to at least one drive motor. The machine further includes a first resistor grid connected in series with two automatic switches, each automatic switch being disposed between the first resistor grid and the DC link and responsive to a switch control signal. A second resistor grid is connected in series with a chopper across the DC link. The chopper is connected between the second resistor grid and the DC link responsive to a duty cycle command. A motor operating a blower is connected across a portion of the first resistor grid via a motor inverter and is responsive to an activation command. An electronic controller is disposed to generate the switch control signal, the duty cycle command, and the activation command when a net energy input into at least one of the first resistor grid and the second resistor grid exceeds a threshold value.

In yet another aspect, the disclosure describes a method for controlling the temperature of one or more resistor grids used to retard an electric drive machine. The method includes evaluating a total power input to the one or more resistor grids, evaluating a total power output from the one or more resistor grids, and calculating a net power difference for power in the one or more resistor grids by subtracting the total power output from the total power input. The net power difference is integrated over time and a cooling sub-routine is activated when the integral of the net power difference exceeds a threshold.

DETAILED DESCRIPTION

This disclosure relates to systems and methods for retarding an electric drive machine or vehicle. The disclosure that follows uses an example of a direct series electric drive vehicle having an engine connected to a generator for producing electrical power that drives the vehicle. In the exemplary embodiments presented, excess electrical energy produced when the machine is retarded is dissipated in the form of heat. The systems and methods disclosed herein have applicability to other electric drive vehicles. For example, a machine or vehicle may include an electric drive with power stored in one or more batteries or other storage devices, instead of being generated by an engine-driven generator. This embodiment may store excess power produced during retarding in the batteries or other mechanical energy storage devices and arrangements rather than dissipating it in the form of heat.

Figure 1A:
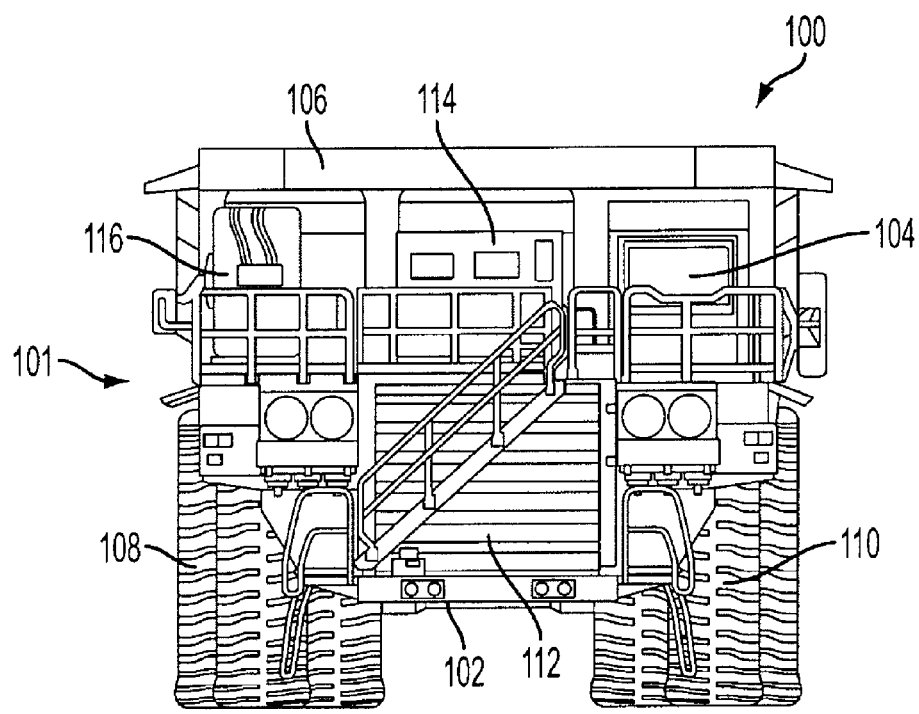
FIGS. 1A and 1B are, respectively, a front view and a side view of a machine in accordance with the disclosure.
Figure 1B:
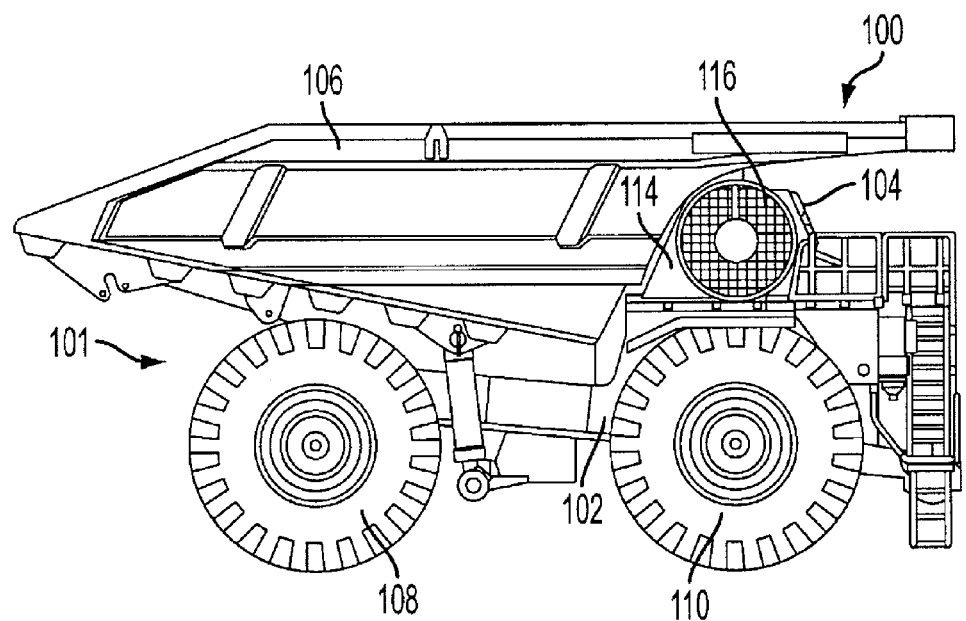

FIG. 1A and FIG. 1B illustrate, respectively, a front and a side view of a machine 100. The machine 100 is a direct series electric drive machine. One example of the machine 100 is an off-highway truck 101 such as those used for construction, mining, or quarrying. In the description that follows, this example illustrates the various arrangements that can be used on machines having direct series electric drive systems. As can be appreciated, any other vehicle having a direct series electric drive or electric-only arrangement can benefit from the advantages described herein. The term "machine," therefore, is used to generically describe any machine having at least one drive wheel that is driven by a motor connected to the wheel. Electrical power may be generated onboard by a generator, alternator, or another power-generation device, which may be driven by an engine or other prime mover. Alternatively, electrical power may be stored but not generated onboard.

A front view of the off-highway truck 101 is shown in FIG. IA, and a side view is shown in FIG. 1B. The off-highway truck 101 includes a chassis 102 that supports an operator cab 104 and a bucket 106. The bucket 106 is pivotally connected to the chassis 102 and is arranged to carry a payload when the off-highway truck 101 is in service. An operator occupying the operator cab 104 can control the motion and the various functions of the off-highway truck 101. The chassis 102 supports various drive system components. These drive system components are capable of driving a set of drive wheels 108 to propel the off-highway truck 101. A set of idle wheels 110 can steer such that the off-highway truck 101 can move in any direction. Even though the off-highway truck 101 includes a rigid chassis with powered wheels for motion and steerable wheels for steering, one can appreciate that other machine configurations can be used. For example, such configurations may include articulated chassis with one or more driven wheels.

Figure 2:
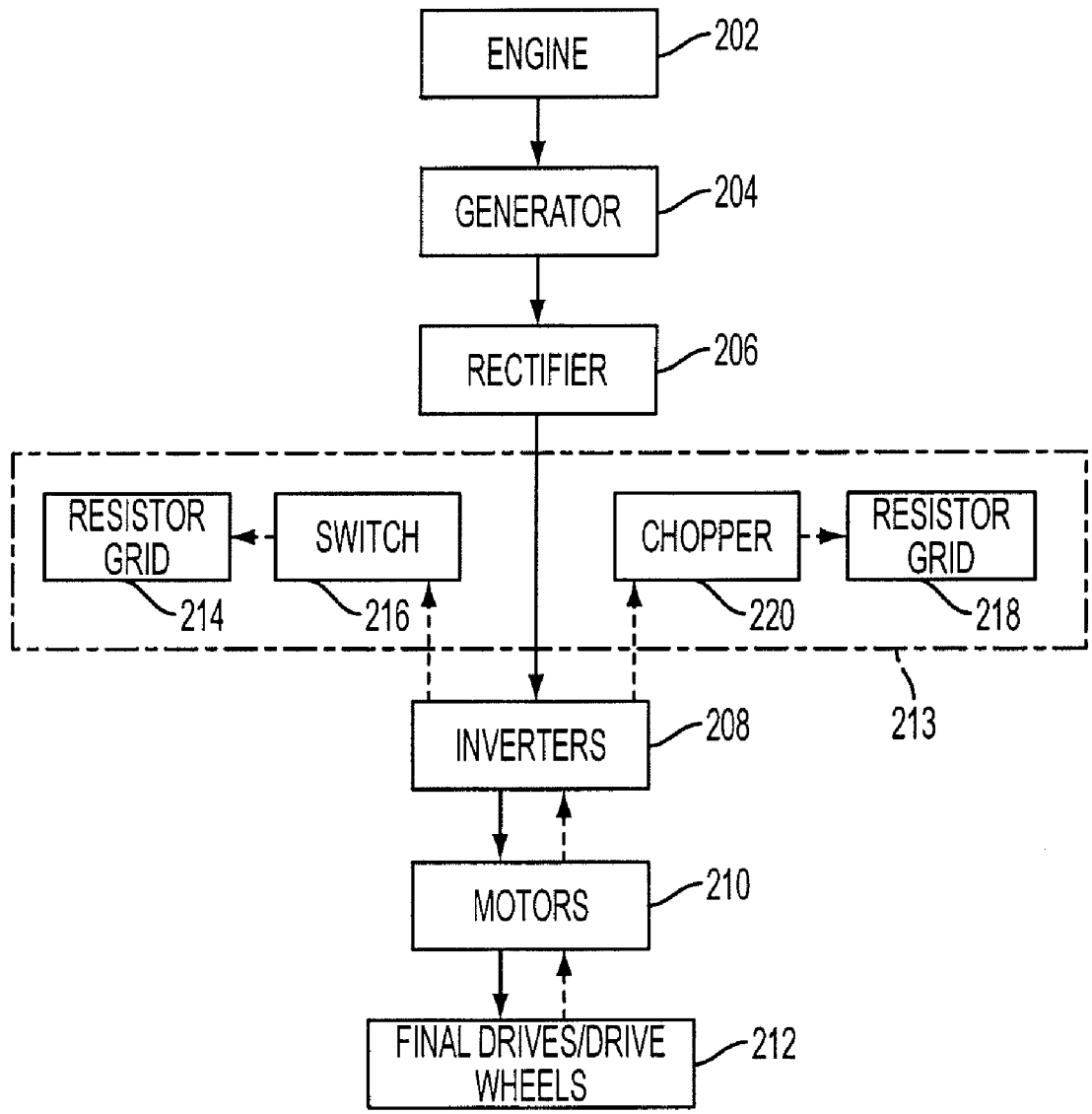
FIG. 2 is a block diagram of a direct series electric drive system for a machine in accordance with the disclosure.

The off-highway truck 101 is a direct series electric drive machine, which in this instance refers to the use of more than one source or form of power to drive the drive wheels 108. A block diagram for the direct series electric drive system of the machine 100, for example, the off-highway truck 101, is shown in FIG. 2. In the block diagram, the flow direction of power in the system when the machine is propelled is denoted by solid-lined arrows. Conversely, the flow of power during a retarding mode is shown in dash-lined arrows. The direct series electric drive system includes an engine 202, for example, an internal combustion engine such as a diesel engine, which produces an output torque at an output shaft (not shown). The output shaft of the engine 202 is connected to a generator 204. In operation, the output shaft of the engine 202 rotates a rotor of the generator 204 to produce electrical power, for example, in the form of alternating current (AC) power. This electrical power is supplied to a rectifier 206 and converted to direct current (DC) power. The rectified DC power may be converted again to AC power by an inverter circuit 208. The inverter circuit 208 may be capable of selectively adjusting the frequency and/or pulse-width of its output, such that motors 210 that are connected to an output of the inverter circuit 208 may be operated at variable speeds. The motors 210 may be connected via final assemblies (not shown) or directly to drive wheels 212 of the machine 100.

When the off-highway truck 101 is propelled, the engine 202 generates mechanical power that is transformed into electrical power, which is conditioned by various electrical components. In an illustrated embodiment, such components are housed within a cabinet 114 (FIG. IA). The cabinet 114 is disposed on a platform that is adjacent to the operator cab 104 and may include the rectifier 206 (FIG. 2), inverter circuit 208 (FIG. 2), and/or other components. When the off-highway truck 101 is to be decelerated or its motion is otherwise to be retarded, for example, to prevent acceleration of the machine when travelling down an incline, its kinetic energy is converted to electrical energy. Effective disposition of this generated electrical power enables effective retarding of the off-highway truck 101.

Specifically, when the machine 100 is retarding, the kinetic energy of the machine 100 is transferred into rotational power of the drive wheels that rotates the motors 210, which act as electrical generators. The electrical power generated by the motors 210 has an AC waveform. Because the inverter circuit 208 is a bridge inverter, power supplied by the motors 210 is rectified by the inverter circuit 208 into DC power. Dissipation of the DC power generated by the motors 210 produces a counter-rotational torque at the drive wheels 108 to decelerate the machine. Dissipation of this DC power may be accomplished by passing the generated current rectified by the inverter circuit 208 through a resistance. To accomplish this, a retarder arrangement 213 may include a first resistor grid 214, described in greater detail below, that is arranged to receive current from the inverter circuit 208 via a switch 216. When the switch 216 is closed, the electrical power corresponding to the current generated by the motors 210 may pass through the first resistor grid 214 and be dissipated as heat. Additionally, excess electrical power is also dissipated as heat as it passes through a second resistor grid 218, which is arranged to receive electrical power via a chopper circuit 220. The chopper circuit 220 operates to selectively route a portion of the developed electrical power through the second resistor grid 218. One embodiment for the drive and retarding system is described in more detail below.

Figure 3:
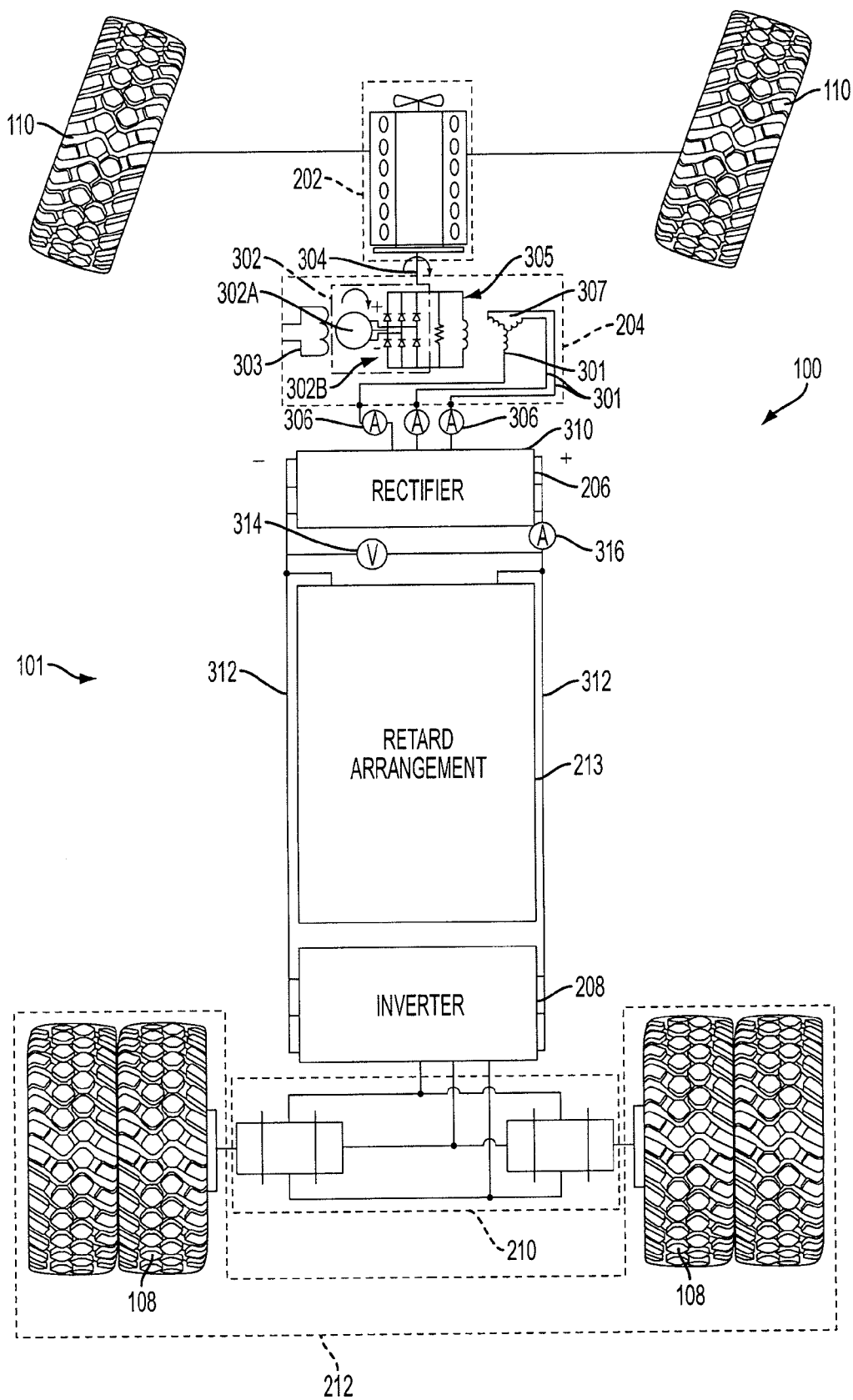
FIG. 3 is a block diagram for a drive and retarding system in accordance with the disclosure.
Figure 4:
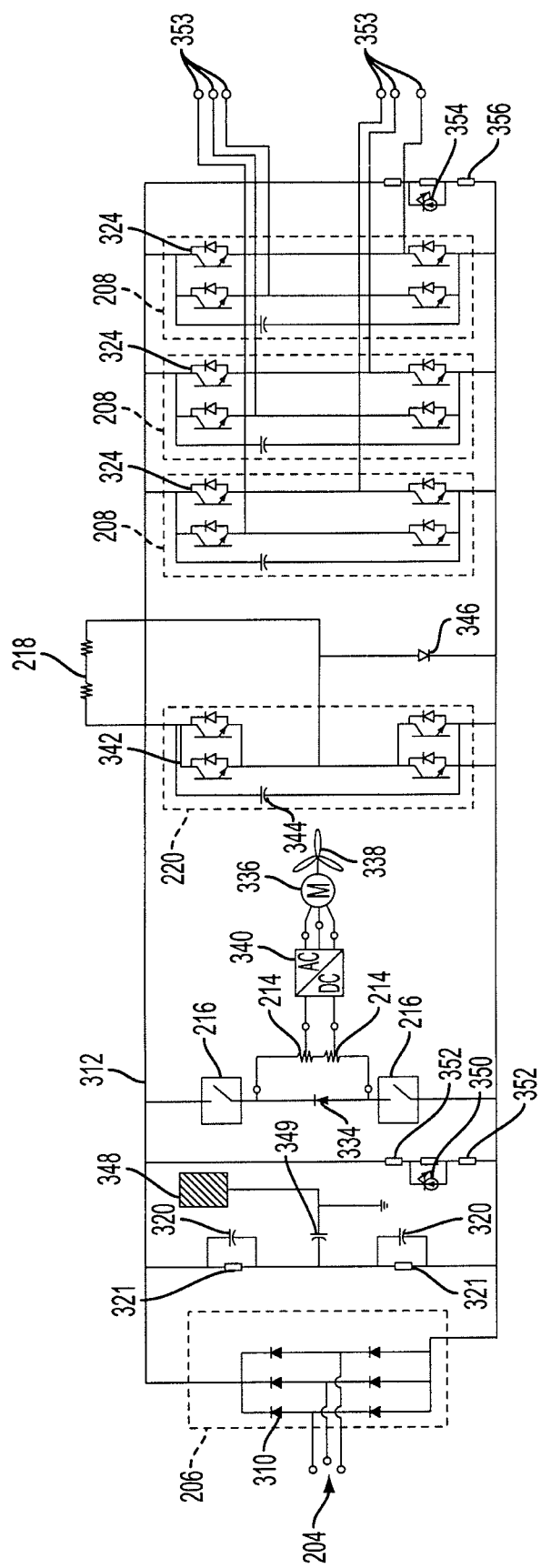
FIG. 4 is a simplified block diagram for the drive and retarding system shown in FIG. 3.

A block diagram of the direct series electric drive system of the off-highway truck 101, as one example for the machine 100, is shown in FIG. 3 and FIG. 4. In these views, elements that were previously described are denoted by the same reference numerals for the sake of simplicity. Further, the block diagram of FIG. 4 includes a particular embodiment with component examples that can be included in the functional blocks shown in FIG. 3. Hence, the block diagrams shown in FIG. 3 and FIG. 4 should be referred to together when considering the description that follows. As shown, the engine 202 is connected to the generator 204 (shown in FIG. 3) via an output drive shaft 304. Even though a direct connection to the output drive shaft 304 is shown, other drive components, such as a transmission or other gear arrangements, may be utilized to couple the output of the engine 202 to the generator 204. The generator 204 may be any appropriate type of generator or alternator known in the power generation art.

In one embodiment, the generator 204 is a three-phase alternating current (AC) synchronous generator having a brushless, wound rotor. The generator 204 has an output 301 for each of three phases of alternating current being generated, with each output having a respective current transducer 306 connected thereto. The rotor of the generator 204 (shown in FIG. 3) includes a rotating rectifier 302 that is connected to a rotating exciter armature 302A. The rotating exciter armature 302A is energized by an excitation field produced by an excitation winding 303. Thus, the application of an excitation signal at the input to the winding 303 creates an excitation field to activate the generator field 305. The generator field 305, in turn, produces the output available at three leads of the armature 307 of the generator 204.

In the illustrated embodiment, the rotating rectifier 302 includes a rotating exciter armature 302A that is connected to a series of rotating diodes 302B. The three current outputs of the generator 204, which are collectively considered the output of the generator 204, are connected to a rectifier 206. Other generator arrangements may alternatively be used.

The rectifier 206 converts the AC power supplied by the generator 204 into DC power. Any type of rectifier 206 may be used. In the example shown, the rectifier 206 includes six power diodes 310 (best shown in FIG. 4) that are arranged in diode pairs around each phase of the output of the generator 204. Each diode pair includes two power diodes 310 that are connected in series to each other, with a connection to each phased output of the generator 204 between each pair. The three pairs of power diodes 310 are connected in parallel to each other and operate to develop a voltage across a DC linkage or DC link 312. This DC link voltage is available at a first rail and a second rail of the DC link 312. The first rail is typically at a first voltage and the second rail is typically at a second voltage during operation. Either of the first and second voltages may be zero.

During operation, a voltage is supplied across the first and second rails of the DC link 312 by the rectifier 206 and/or an inverter circuit 208. One or more capacitors 320 may be connected in parallel with one or more resistors 321 across the DC link 312 to smooth the voltage V across the first and second rails of the DC link 312. The DC link 312 exhibits a DC link voltage, V, which can be measured by a voltage transducer 314, and a current, A, which can be measured by a current transducer 316, as shown in FIG. 3.

The inverter circuit 208 is connected in parallel with the rectifier 206 and operates to transform the DC voltage V into variable frequency sinusoidal or non-sinusoidal AC power that powers, in this example, two drive motors 210 (FIG. 3). Any known inverter may be used for the arrangement of the inverter circuit 208. In the example shown in FIG. 4, the inverter circuit 208 includes three phase arrays of insulated-gate bipolar transistors (IGBT) 324 that are arranged in transistor pairs and that are configured to supply a 3-phase AC output to each drive motor 210.

The inverter circuit 208 can control the speed of the motors 210 by controlling the frequency and/or the pulse-width of the AC output. The drive motors 210 may be directly connected to the drive wheels 108 or, as in the example shown in FIG. 3, may power the final drives that power the drive wheels 212. Final drives, as is known, operate to reduce the rate of rotation and increase the torque between each drive motor 210 and each set of drive wheels 212.

In alternative embodiments, the engine 202 and generator 204 are not required to supply the power necessary to drive the drive motors 210. Instead, such alternative embodiments use another source of power, such as a battery or contact with an electrified rail or cable. In some embodiments, one drive motor 210 may be used to power all drive wheels of the machine, while in other embodiments, any number of drive motors may be used to power any number of drive wheels, including all wheels connected to the machine.

Returning now to the block diagrams of FIG. 3 and FIG. 4, when the machine 100 operates in an electric braking mode, which is also known as electric retarding, less power is supplied from the generator 204 to the DC link 312. Because the machine is travelling at some non-zero speed, rotation of the drive wheels 108 due to the kinetic energy of the machine 100 will power the drive motors 210. The drive motors 210, in this mode, act as generators by producing AC electrical power. Consumption or disposition of this electrical power will consume work and act to apply a counter-rotational torque on the drive wheels 108, causing them to reduce their rotational speed, thus retarding the machine.

The generated AC electrical power can be converted into DC electrical power through the inverter circuit 208 for eventual consumption or disposition, for example, in the form of heat. In an illustrated embodiment, a retarder arrangement 213 consumes such electrical power generated during retarding. The retarder arrangement 213 can include any suitable arrangement that will operate to dissipate electrical power during retarding of the machine. In the exemplary embodiments shown in FIG. 4, the retarder arrangement 213 includes a first resistor grid 214 that is arranged to dissipate electrical energy at a fixed rate. The retarder arrangement 213 also includes a second resistor grid 218, to which DC current is supplied at a selectively variable rate by use of a pulse width modulator (PWM) or chopper circuit 220. In this way, the second resistor grid 218 dissipates electrical energy at a variable rate.

When the machine 100 is to operate in a retarding mode, the first resistor grid 214 is connected between the first and second rails of the DC link 312 so that current may be passed therethrough. When the machine 100 is being propelled, however, the first resistor grid 214 is electrically isolated from the DC link 312 by two contactors or bipolar automatic switches (BAS) 216. Each BAS 216 may include a pair of electrical contacts that are closed by an actuating mechanism, for example, a solenoid (not shown) or a coil creating a magnetic force that attracts the electric contacts to a closed position. The BAS 216 may include appropriate electrical shielding and anti-spark features that can allow these items to operate repeatedly in a high voltage environment.

When the machine 100 initiates retarding, it is desirable to close both BAS 216 within a relatively short time period such that the first resistor grid 214 is placed in circuit between the first and second DC rails to begin energy dissipation rapidly. Simultaneous actuation or actuation at about the same time, such as, within a few milliseconds, of the pair of BAS 216 may also advantageously avoid charging the first resistor grid 214 and other circuit elements to the voltage present at the rails of the DC link 312. The pair of BAS 216 also prevents exposure of each of the BAS 216 or other components in the system to a large voltage difference (the voltage difference across the DC link 312) for a prolonged period. A diode 334 may be disposed in parallel to the first resistor grid 214 to reduce arcing across the BAS 216, which also electrically isolates the first resistor grid 214 from the DC link 312 during a propel mode of operation.

When the machine 100 is retarding, a large amount of heat can be produced by the first resistor grid 214. Such energy, when converted to heat, must be removed from the first resistor grid 214 to avoid an overheating condition. For this reason, a blower 338, driven by a motor 336, operates to convectively cool the first resistor grid 214. There are a number of different alternatives available for generating the power to drive the motor 336. In this embodiment, a DC/AC inverter 340 is arranged to draw power from voltage-regulated locations across a portion of the first resistor grid 214. The DC/AC inverter 340 may advantageously convert DC power from the DC link 312 to 3-phase AC power that drives the motor 336 when voltage is applied to the first resistor grid 214 during retarding.

In the illustrated embodiment, the BAS 216 are not arranged to modulate the amount of energy that is dissipated through the first resistor grid 214. During retarding, however, the machine 100 may have different energy dissipation requirements. This is because, among other things, the voltage V in the DC link 312 should be controlled, for example, to be within a predetermined range. To meet such dissipation requirements, the second resistor grid 218 can be exposed to a controlled current during retarding through action of the chopper circuit 220. The chopper circuit 220 may have any appropriate configuration that will allow modulation of the current supplied to the second resistor grid 218. In this embodiment, the chopper circuit 220 includes an arrangement of transistors 342 that can, when actuated according to a desired frequency and/or duration, modulate the current passed to the second resistor grid 218. This controls the amount of energy dissipated by the second resistor grid 218 during retarding. The chopper circuit 220 may additionally include a capacitor 344 that is disposed between the first and second rails of the DC link 312 and that regulates the voltage input to the chopper circuit 220. A switched diode 346 may be connected between the second resistor grid 218 and the DC link 312 to protect against short circuit conditions in the DC link 312.

The passage of current through the second resistor grid 218 will also generate heat, necessitating cooling of the second resistor grid 218. In this embodiment, the first and second resistor grids 214 and 218 may both be located within the blower housing 116 (also shown in FIG. 1A and FIG. 2) for convective cooling when the motor 336 and blower 338 are active.

The embodiment for a drive system shown in FIG. 4 includes other components that are discussed for the sake of completeness. Such components are optional but are shown herein because they promote smooth and efficient operation of the drive system. In this exemplary embodiment, a leakage detector 348 is connected between the two resistors 321, in series with a capacitor 349, to the first and second rails of the DC link 312. The leakage detector 348 detects any current leakage to ground from either of the first and second rails of the DC link 312. Further, in one embodiment, a first voltage indicator 350 may be connected between resistors 352 across the first and second rails of the DC link 312. The first voltage indicator 350 may be disposed between the rectifier 206 and the retarder arrangement 213 such that a high voltage condition may be detected. In a similar fashion, a second voltage indicator 354 may be connected between resistors 356 across the first and second rails of the DC link 312. The second voltage indicator 354 may be disposed between connection nodes 353 that connect to the drive motors 210 and the inverter circuit 208 to detect a voltage condition occurring during, for example, a bus bar fracture where the DC link 312 is not continuous, to diagnose whether the inverter is operating.

Figure 5:
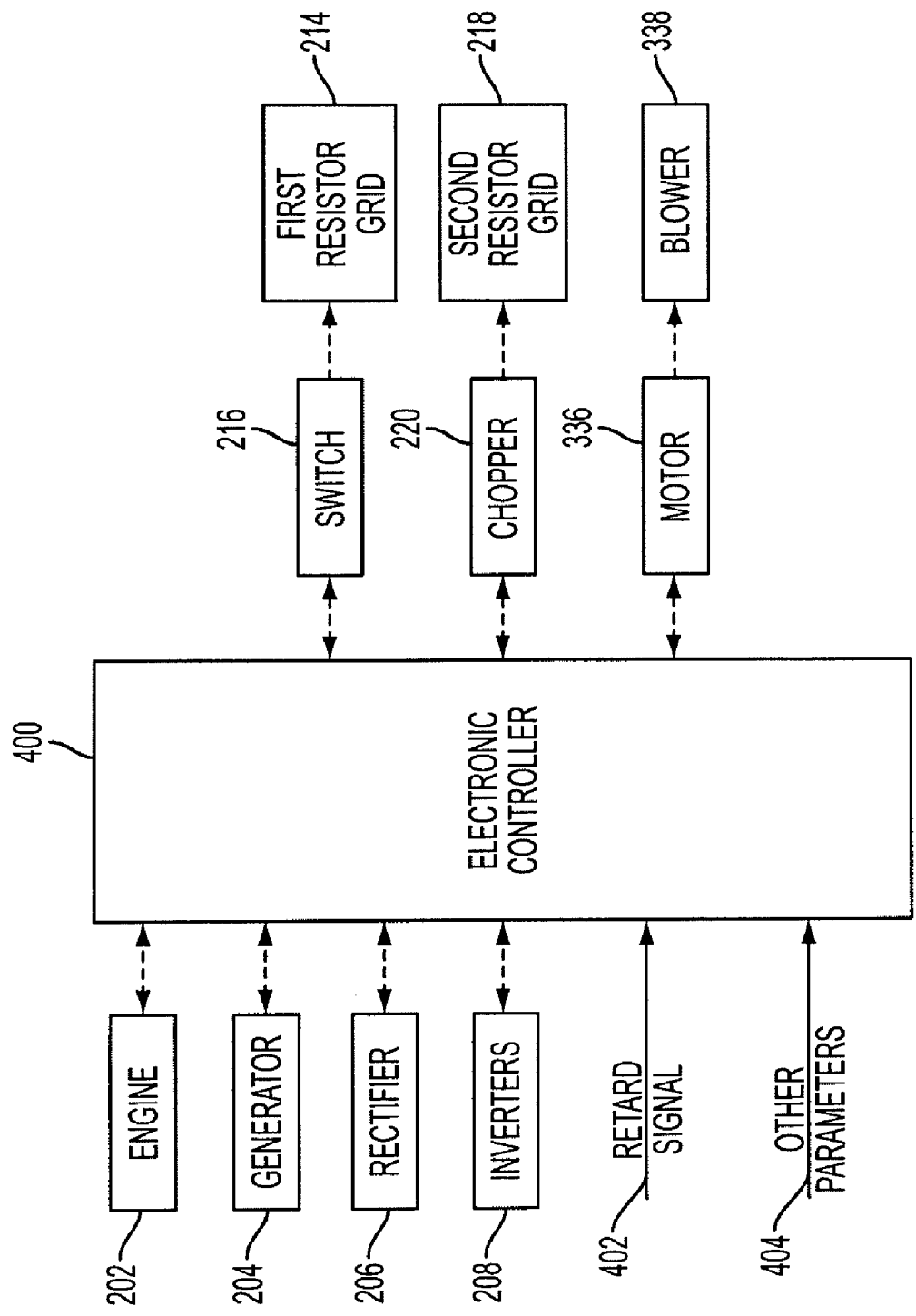
FIG. 5 is a block diagram showing various connections between an electronic controller and various components and/or systems of an electric drive machine in accordance with the disclosure.

A block diagram representation of an electronic controller used in the drive system is shown in FIG. 5. The electronic controller may be a single controller or may include more than one controller disposed to control various functions and/or features of a machine. For example, a master controller, used to control overall operation of the machine, may be cooperatively implemented with a motor or engine controller, used to control the engine 202. In this embodiment, the term "controller" is meant to include one, two, or more controllers that may be associated and that may cooperate in controlling various functions and operations of the machine 100 (FIG. 1A). Accordingly, various interfaces of the controller are described relative to components of the drive system shown in the block diagram of FIG. 3, but these interfaces are not intended to limit the type and number of components that are connected, or the number of controllers that are described.

In FIG. 5, an electronic controller 400 is connected to the rectifier 206, the inverter circuit 208, the BAS 216, and the chopper circuit 220. The connections between the electronic controller 400 and various other components or systems of the machine may advantageously be connections that permit the controller 400 to receive information signals and to supply command signals to various components. This enables the electronic controller 400 to both receive information concerning the operation of the systems from sensors integrated therewith, as well as send commands to various actuators or electronic devices, such as transistors or actuators, that are associated with those systems. The electronic controller 400 may also be connected to other components or systems of the machine that are related to the retarder arrangement 213 and/or other systems of the machine 100. Connections of the electronic controller 400 that are pertinent to the discussion that follows are presented for the sake of simplicity.

During operation of the machine 100, the electronic controller 400 may receive a retarding command from an input node 402. The retarding command provided at the input node 402 may be generated in response to displacement of a manual control by the operator (not shown). It may alternatively be a command signal generated by the electronic controller 400, or another controller of the machine that monitors or governs the speed of the machine, for example, a speed governor or a speed limiter. The electronic controller 400 may receive and interpret the retarding command according to a control system or algorithm operating therein. The control system may calculate a magnitude of the retarding being commanded, for example, in units of energy or power. Based on these data, the control system may determine whether the first, second, or both resistor grids 214 and 218 should provide a contribution to retarding energy dissipation.

This determination or calculation may be based on various machine operating parameters. Such parameters may include the machine's current speed, payload, rate of acceleration, the desired speed of the machine including a command to stop the machine, the rate of change of the command to retard, and so forth, which may be input to the controller 400 via one or more additional input nodes 404. Such variables are appropriately processed by the control system to determine the optimum mode of activation of the first and/or second resistor grids 214 and 218, as described below.

The electronic controller 400 may, at certain times, provide command signals to activate the chopper circuit 220 to "throttle" power through the second resistor grid 218 by placing the second resistor grid 218 in circuit between the first and second rails of the DC link. This may occur when the retarding command is relatively low. Stated differently, the second resistor grid 218 may be activated without activation of the first resistor grid 214 when the heat dissipation required to achieve the commanded retarding command is below the maximum permissible heat dissipation rating of the second resistor grid 218. Similarly, the electronic controller 400 may command the BAS 216 to close, thus placing the first resistor grid 214 in circuit between the first and second rails of the DC link. In addition, the controller 400 may provide command signals to activate the chopper circuit 220 to selectively place the second resistor grid 218 in circuit between the first and second rails of the DC link, particularly upon receipt of retarding commands that are large or that need to be completed in relatively short time periods.

In the illustrated embodiment, activation of the chopper circuit 220 to modulate the power dissipated by the second resistor grid 218 may be expected to occur on a fairly regular basis when the machine is being retarded. Placement of the first resistor grid 214 in circuit between the first and second rails of the DC link may occur less frequently. Even though such operation is effective and economical for fuel conservation of the machine, the motor 336 and blower 338 may not be activated as no power is applied to the circuit including the first resistor grid 214 for an extended time period. Accordingly, the heat dissipated by the second resistor grid 218 may elevate the temperature of the grid and other surrounding components without cooling by the blower 338.

To address such conditions, an energy calculation may be used to estimate the temperature of the first and second resistor grids 214 and 218. Based on the energy calculation, the controller 400 may provide appropriate command signals to selectively activate the BAS 216 to apply power to the circuit including the first resistor grid 214. Such power activates the blower 338 when cooling is required. Such application of power to the first resistor grid 214 may occur under conditions that would otherwise require no power dissipation through the resistor grids or activation of only the chopper circuit 220. Because power dissipation through the first resistor grid 214 will result when the first resistor grid 214 is placed in circuit to provide power to the blower 338, the controller 400 may compensate for this power loss in the system. In an embodiment, the controller 400 may command the engine and/or the generator to increase their power output to maintain the voltage developed at the first and second rails of the DC link. This may reduce the effect of the power drain through the first resistor grid 214 with respect to machine operation to reduce operator perception of such effect.

Figure 6:
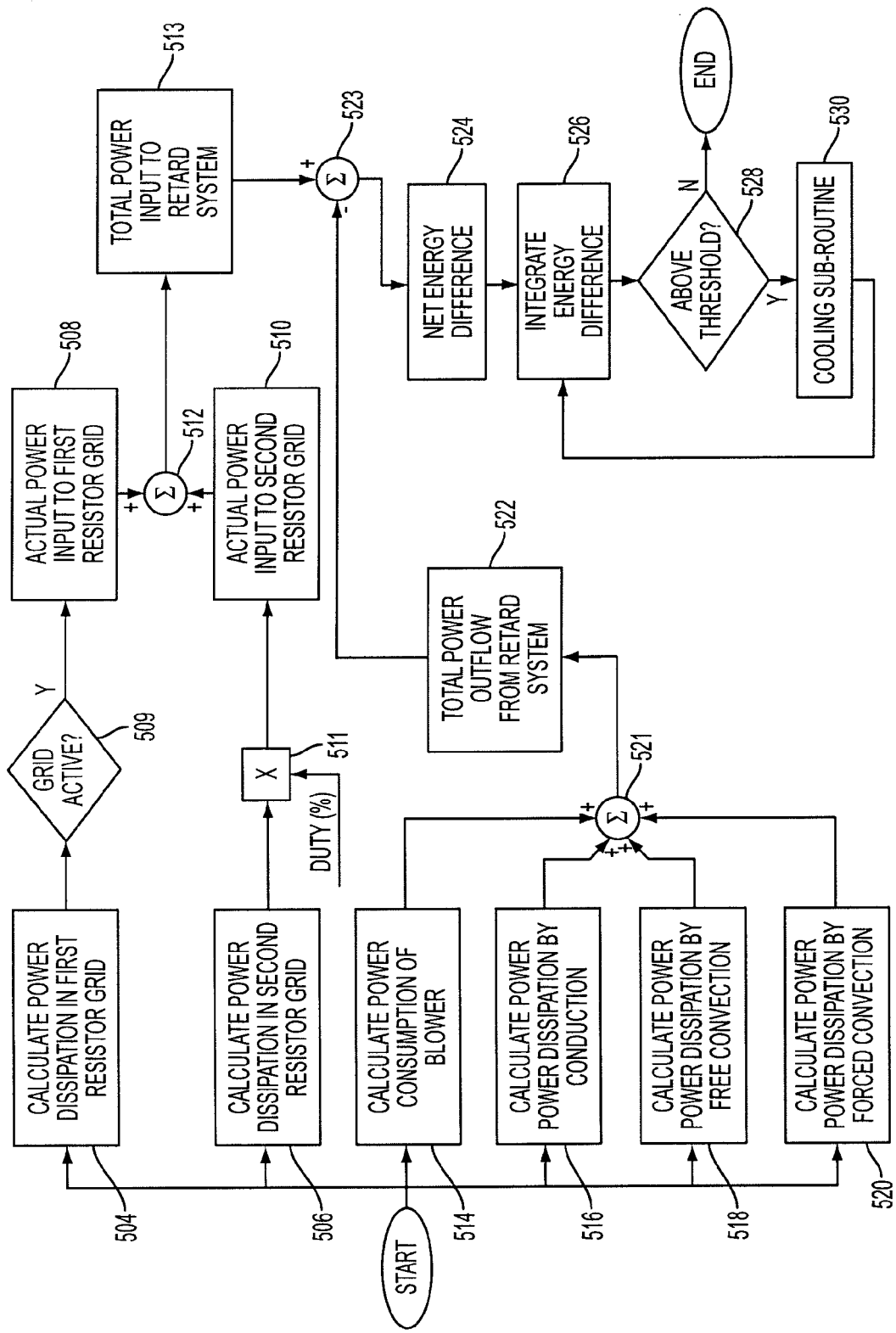
FIG. 6 is a block diagram of a control algorithm for controlling a cooling sub-routine in an electric drive machine based on the net energy input to a thermal energy retarding system thereof in accordance with the disclosure.

FIG. 6 shows one embodiment of an energy calculation algorithm for use by a control system. Here, the electronic controller 400 (FIG. 5) may receive a signal indicative of the voltage of the DC link 312 (FIG. 3). As is known, the power dissipation in a resistor having a resistance, R, when a voltage, V, is applied thereto, is equal to the ratio of the square of the voltage divided by the resistance ($V^2/R$). Hence, the algorithm may calculate the power dissipation in the first resistor grid 214 (FIG. 2) at 504 by, for example, dividing the square of the voltage of the DC link 312 by the resistance of the first resistor grid 214. The resistance R is a value that can be pre-programmed in the controller. The resistance of the first resistor grid 214 may be considered a constant or may alternatively be adjusted based on the temperature of the first resistor grid 214, if an appropriate temperature sensor (not shown) is available. This achieves improved accuracy in the result of the calculation at 504. In a similar fashion, the algorithm may calculate the rate of power dissipation in the second resistor grid 218 at 506.

The power dissipation in the first resistor grid 214 only occurs when the BAS 216 (FIG. 3) are closed and current flows through the first resistor grid 214. Similarly, the power dissipation in the second resistor grid 218 depends on the duty cycle (%) or the percentage of "on" time of the chopper circuits 220. Hence, the algorithm may determine the actual power dissipation in the first resistor grid 214 at 508 by considering the result of the calculation at 504 only when the BAS 216 are closed at 509. Similarly, the algorithm may determine the actual power dissipation in the second resistor grid 218 at 510 by applying a chopper duty cycle (%) at 511 to the result of the calculation at 506.

The actual power dissipation of the first resistor grid at 508 and of the second resistor grid at 510 may be summed at 512 to yield the total power dissipation for the retarding system at 513. This total power represents the power input to the retarding system, which the retarding system is required to dissipate into the environment. For example, in the retarder arrangement 213 (FIG. 3), power may be dissipated into the environment via conduction, free convection, or forced convection when the blower 338 (FIG. 4) is active. Moreover, power may be consumed within the retarding system when the motor 336 (FIG. 4) operates. The algorithm may perform approximations of each of these heat transfer modes and power consumption mode to estimate the energy buildup state of the retarding system. In an embodiment, the algorithm considers a form of a power balance between power input and power output of the retarding system. One mode of determining parameters for use in such a power equation is described below.

First, the algorithm may calculate a power consumption of the blower at 514 (FIG. 6), which has a known power rating. To do so, the algorithm applies a correction factor to the total power consumed by the fan of the blower. The total power consumption of the fan may be based on an actual or estimated blower-fan shaft speed. Other parameters may be considered in the calculation of the power consumed by the blower. For example, the voltage supplied to the motor driving the blower may be acquired. This signal may be used to approximate the power consumed by the blower when the blower is active. Second, the algorithm may calculate the power dissipation from the retarding system due to conduction at 516 (FIG. 6) by, for example, estimating a heat transfer rate based on the thermal conductivity and temperature of the materials that make up the components surrounding the resistor grids. Alternatively, the heat loss due to conduction may simply be approximated by assuming a constant heat transfer rate.

Third, the algorithm may calculate the power dissipation from the retarding system due to free convection at 518 by, for example, estimating a heat transfer based on the temperature of the resistor grids and their surrounding components as well as the geometry of the surrounding components. Free convection of heat from the resistor grids occurs when the blower is not active. Alternatively, the heat loss due to free convection may simply be approximated. Last, the algorithm may calculate the power dissipation due to forced convection or cooling by the blower at 520 by, for example, estimating a heat transfer based on the temperature of the resistor grids, the surrounding geometry, and the shaft speed of the blower fan. Forced convection of heat from the resistor grids occurs when the blower is active.

The algorithm may sum, at 521, the power consumed by the blower fan, which was calculated at 514, with the heat transfer from the resistor grids due to the various heat transfer modes, which was calculated at 516, 518, and 520. This summation yields a total power outflow from the retarding system at 522. The algorithm may then compare the total power input to the retarding system, which is calculated at 513, with the total power outflow from the system, which is calculated at 522. Specifically, the algorithm subtracts the total power outflow from the total power input at 523 to yield a total energy difference at 524.

The total energy difference calculated at 524 may be input to an integrator or another monitor device at 526. This device monitors the retarding system for energy accumulation. Such energy accumulation, when positive, may mean that a greater amount of energy is input to the retarding system than the system is able to dissipate. Such a condition may occur, for instance, at times when the machine retards often and by small amounts. In this case, the machine may repeatedly use the chopper circuits 220 (FIG. 2) and with little or no use of the BAS 216 (FIG. 3). Moreover, the blower 338 may require a time period following activation reach full power. In one embodiment, for example, the blower 338 may require about 15 seconds or more to produce a flow of cooling air. In this case, retarding events, or placements of the circuit that includes the motor 336 in circuit, lasting for fewer than 15 seconds will not permit a sufficient activation of the blower 338 to dissipate heat. Such conditions may require intervention and actuation of the blower 338, which will increase the power dissipation in the retarding system by forcibly cooling the resistor grids.

The energy being monitored at 526 is aggregated and compared to a threshold at 528. When the total energy accumulation of the retarding system exceeds the threshold, the algorithm may activate a cooling subroutine at 530. Such activation may, in turn, activate the first resistor grid 214 by closing the BAS 216. The subroutine 530 may further activate the blower 338 by starting the motor 336. The subroutine 530 may also begin controlling the engine and/or generator of the machine to maintain the power in the DC link 312 at an appropriate operating level. As a result of these adjustments, the power outflow of the retarding system should increase. This will decrease the accumulated energy and, thus, the temperature of the retarding system to a value below the threshold at 528. The algorithm may further have a hysteresis function that will avoid a premature deactivation of the subroutine 530.

INDUSTRIAL APPLICABILITY

The industrial applicably of the methods and systems for braking machines described herein will be readily appreciated from the foregoing discussion. The present disclosure is applicable to many machines and many environments. One exemplary machine suited to use of the disclosed principles is a large off-highway truck, such as a dump truck. Exemplary off-highway trucks are commonly used in mines, construction sites and quarries. The off-highway trucks may have payload capabilities of 100 tons or more and travel at speeds of 40 miles per hour or more when fully loaded. The trucks operate in a variety of environments and must be able to negotiate steep inclines in dry or wet conditions.

Similarly, the methods and systems described above can be adapted to a large variety of machines and tasks. For example, backhoe loaders, compactors, feller bunchers, forest machines, industrial loaders, skid steer loaders, wheel loaders and many other machines can benefit from the methods and systems described.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A machine having a hybrid-electric drive system, the hybrid-electric drive system including an engine connected to a generator, a rectifier connected to the generator and to a direct current (DC) link, an inverter connected to the DC link and to at least one drive motor, the machine further comprising:

a first resistor grid connected in series with two automatic switches, each of the two automatic switches disposed between the first resistor grid and the DC link, wherein each automatic switch is responsive to a switch signal;

a second resistor grid connected in series with a chopper and in parallel with the DC link, the chopper disposed between the second resistor grid and the DC link, wherein the chopper is responsive to a duty cycle command;

a motor operating a blower, the motor connected across a portion of the first resistor grid via a motor inverter, wherein the motor is responsive to an activation command;

an electronic controller disposed to generate the switch signal, the duty cycle command, and the activation command when a net energy input into at least one of the first resistor grid and the second resistor grid exceeds a threshold value, the electronic controller further disposed to calculate first and second power inputs for power dissipated by the first and second resistor grids respectively, a total power input based on the first and second power inputs, a first power output for power consumed by the motor, a second power output for power dissipated by conduction from the first and second resistor grids, a third power output for power dissipated by free convection from the first and second resistor grids, a fourth power output for power dissipated by forced convection from the first and second resistor grids when the motor is active, and a total power output that is based on the first, second, third, and fourth power outputs, and to calculate a difference between total power input and total power output, integrate the difference over time, and activate a cooling sub-routine when the net power difference exceeds the threshold value.

2. The machine of claim 1, wherein the electronic controller is disposed to receive a retarding signal and adjust at least one of the switch signal and the duty cycle command based on the retarding signal.

3. The machine of claim 1, wherein the electronic controller is further disposed to adjust a command that controls the inverter when the machine is in a retarding mode such that a voltage of the DC link is maintained within a desired range when the two automatic switches are closed.

4. The machine of claim 1, wherein the second power input is at least partially based on the duty cycle command.

5. The machine of claim 1, wherein the second power output is at least partially based on a temperature of the first and second resistor grids and an ambient temperature.

6. The machine of claim 1, wherein the fourth power output is based on one of the activation command, an output shaft speed of the motor, and a time delay following the activation command.

7. The machine of claim 1, wherein the cooling sub-routine includes adjusting the switch signal to close the two automatic switches such that the first resistor grid is exposed to a voltage of the DC link, adjusting the duty cycle command of the chopper to control the voltage of the DC link, and generating a motor signal to activate the motor.

8. A method of controlling a temperature of one or more resistor grids used to retard an electric drive machine, the method comprising:
    evaluating a total power input to the one or more resistor grids;
    evaluating a total power output from the one or more resistor grids;
    calculating a net power difference for power in the one or more resistor grids by subtracting the total power output from the total power input;
    integrating the net power difference over time; and
    activating a cooling sub-routine when an integral of the net power difference exceeds a threshold.

9. The method of claim 8, wherein evaluating the total power input includes:
    calculating a first power input to a first resistor grid;
    calculating a second power input to a second resistor grid;
    adding the first power input and the second power input to yield the total power input; and
    wherein evaluating the total power output includes:
    calculating a first power output for power consumed by a motor that operates a blower and that is disposed to receive power from the first resistor grid;
    calculating a second power output for power dissipated by conduction from the first resistor grid and the second resistor grid;
    calculating a third power output for power dissipated by free convection from the first resistor grid and the second resistor grid;
    calculating a fourth power output for power dissipated by forced convection from the first resistor grid and the second resistor grid when the motor is active; and
    adding the first, second, third, and fourth power outputs to yield the total power output.

10. The method of claim 9, further including modulating a current passing through the second resistor grid based on a duty cycle and activating a blower to cool the first resistor grid and the second resistor grid, the blower being powered by a motor disposed in parallel electrical connection across a portion of the first resistor grid via an inverter.

11. The method of claim 10, further including adjusting the duty cycle based on a retarding signal.

12. The method of claim 10, wherein the second power input is at least partially based on the duty cycle.

13. The method of claim 10, wherein the second power output is at least partially based on a temperature of the first and second resistor grids and an ambient temperature.

14. The method of claim 10, wherein the fourth power output is based on one of an activation state of the motor, an output shaft speed of the motor, and a time delay following an activation of the motor.

15. The method of claim 10, wherein the cooling sub-routine includes exposing the first resistor grid to DC power, adjusting a duty cycle of a chopper to regulate the voltage of the DC power, and generating a motor signal to activate the motor.

* * * * *